UNITED STATES PATENT OFFICE.

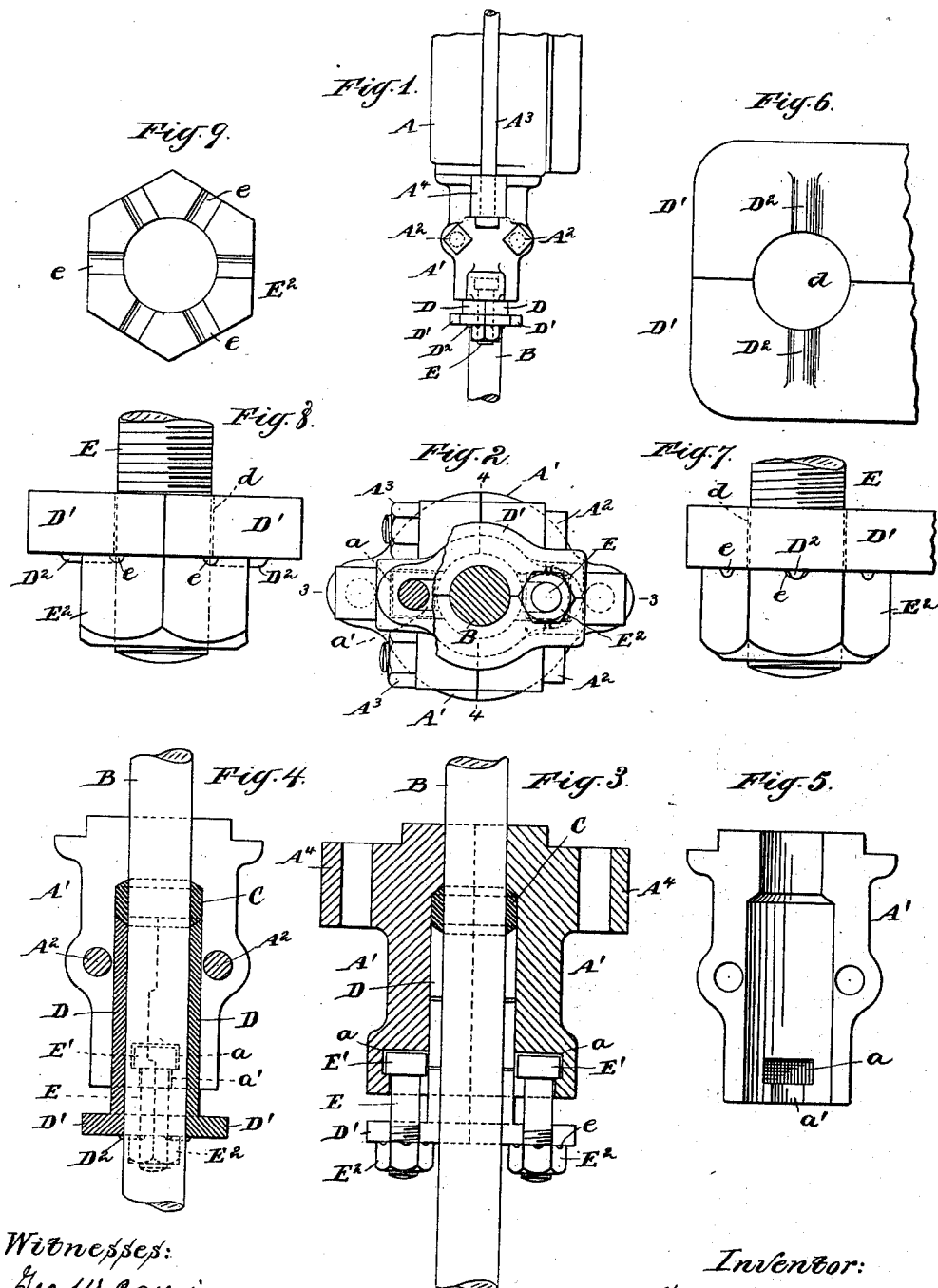

WARREN WOOD, OF PATERSON, NEW JERSEY.

ROCK-DRILL.

SPECIFICATION forming part of Letters Patent No. 670,750, dated March 26, 1901.

Application filed January 15, 1901. Serial No. 43,367. (No model.)

*To all whom it may concern:*

Be it known that I, WARREN WOOD, a citizen of the United States, residing in Paterson, in the county of Passaic and State of New Jersey, have invented a certain new and useful Improvement in Rock-Drills, of which the following is a specification.

The invention relates to means for holding the packing sleeve or gland for the piston-rod securely to the front head or lower cylinder-head; and the object of the invention is to secure the gland and its holding bolts and nuts against accidental loosening and displacement under the severe vibration and rough usage to which machinery of this type is necessarily subjected.

The invention consists in providing internal recesses in the cylinder-head in which the heads of the bolts are received and are locked in position by the gland and in forming slight ridges on the gland-flanges adjacent to the holes through which the bolts extend and producing corresponding grooves or channels on the bearing-face of each nut matching to the ridges and serving to prevent the nuts from loosening or "backing off." The resiliency of the packing allows the nuts to be turned to the proper extent by yielding, while the plane portions of the nuts pass the ridges and again expanding when the grooves and ridges coincide, the elasticity of the packing thus exerting sufficient force to insure engagement, but allowing the parts to be forcibly separated when necessary.

The accompanying drawings form a part of this specification and show the invention as I have carried it out.

Figure 1 is a side elevation of the lower portion of a rock-drill cylinder constructed in accordance with the invention. Figs. 2, 3, 4, and 5 are on a larger scale and show the front head and its equipments. Fig. 2 is an end view. Fig. 3 is a vertical section on the line 3 3 in Fig. 2. Fig. 4 is a corresponding section on the line 4 4 in Fig. 2. Fig. 5 is an elevation showing the inner face of one portion of the head. The remaining figures are on a still larger scale. Fig. 6 is a view of the under face of a portion of the gland-sections alone. Fig. 7 is a corresponding side view showing a nut in place, and Fig. 8 is an end view of the same parts. Fig. 9 shows the under face of one of the nuts.

Similar letters of reference indicate the same parts in all the figures.

A is a portion of the cylinder, and A' the lower cylinder-head or "front head" in two parts secured together by the transverse bolts and nuts $A^2$ $A^3$ to serve as a single piece, as usual, and joined to the cylinder by the side rods $A^3$, extending through the lugs $A^4$ or by any approved means. The head is bored to admit the piston-rod B and is counterbored to receive the packing C and the packing-sleeve sections D D, serving as a gland to compress the packing.

At the lower end of the head are internal cavities or recesses $a$ $a$ produced in the castings, opening into the space occupied by the gland, and adapted to receive the square heads E' E' of the bolts E E, extending through slots $a'$ $a'$, communicating with the recesses, but smaller than the latter, and adapted to match to the body portions of the bolts. The screw-threaded outer ends extend beyond the lower face of the head and pass through openings $d$ $d$ in the gland-flange D' and receive nuts $E^2$ $E^2$.

In assembling these parts the bolts are first inserted in the recesses $a$ $a$ and the two portions of the head applied to inclose the piston-rod and bolted together. The packing-rings are next placed on the rod, and then the gland is applied in two pieces and forced into the head, thus locking the bolts in place by closing the entrances to the recesses and filling the annular space around the rod. The nuts are then applied and hold the gland strongly in place. Thus bound together it is obviously impossible for the bolts to drop out, so long as the gland is securely held. To insure the nuts $E^2$ $E^2$ against accidental turning to release the gland, I provide two or more slight grooves or channels $e$ $e$ on the under face of each, adapted to engage with the ridges $D^2$ $D^2$ on the gland-flange D', adjacent to the openings $d$ $d$. The ridges are slight, and the grooves are rounded, as shown, to permit the nuts to be turned by the application of sufficient force, the lands or plane portions between the grooves riding the ridges by forcing the gland inward against the yielding resistance offered by the packing. The nut is finally located with two of its grooves matching to and engaged with the ridges. Thus conditioned the reverse movement of the nut cannot be initiated without again compressing the packing, and when the drill is sinking vertical or angular holes the locking is aided by the gravity of the gland-sections tending to rest upon the nuts, and thus further insure engagement with the grooves.

In addition to the obvious advantages of insuring the parts against separation and consequent accident the inside arrangement of the bolts avoids outside cavities liable to become filled with grease and dust and allows the exterior of the casting to present an unbroken appearance.

I claim—

1. In a rock-drill, a cylinder-head, a gland fitting therein and having a flange, holding-bolts securing the gland to the head, inwardly-opening recesses in the latter receiving the heads of said bolts, the body portions thereof lying in slots opening into said recesses and extending axially of said head through said flange and receiving nuts on their outer ends, whereby the heads of said bolts are locked in said recesses by said gland, all substantially as herein specified.

2. A cylinder-head, an elastic packing and a gland therein, a flange on the latter, and bolts received in said head and extending through said flange, in combination with ridges on said flange adjacent to said bolts, and nuts matching to the bolts and having grooves on their bearing-faces adapted to engage with said ridges, whereby said nuts are held against accidental loosening, all substantially as and for the purposes herein specified.

3. The cylinder-head $A'$ having the inwardly-opening recesses $a\ a$ and slots $a'\ a'$ communicating with said recesses, bolts $E\ E$ having their heads $E'\ E'$ received in said recesses and their body portions in said slots, a gland $D$ fitting in said head and locking said bolts in place, a flange $D'$ on said gland having the holes $d\ d$ receiving the outer ends of bolts, ridges $D^2\ D^2$ on said flange adjacent to said holes, and nuts $E^2\ E^2$ having grooves $e\ e$ on their bearing-faces adapted to engage said ridges, all combined and arranged to serve substantially as and for the purposes specified.

In testimony that I claim the invention above set forth I affix my signature in presence of two witnesses.

WARREN WOOD.

Witnesses:
CHARLES R. SEARLE,
EDWIN GOULD.